US012459101B2

(12) United States Patent
Jonsson et al.

(10) Patent No.: US 12,459,101 B2
(45) Date of Patent: Nov. 4, 2025

(54) HANDHELD POWER TOOL

(71) Applicant: HUSQVARNA AB, Huskvarna (SE)

(72) Inventors: Andreas Jonsson, Huskvarna (SE); Jens Frobom, Huskvarna (SE); Jakob Leijon, Huskvarna (SE); Simon Andregard, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/436,506

(22) Filed: Feb. 8, 2024

(65) Prior Publication Data

US 2024/0261955 A1 Aug. 8, 2024

(30) Foreign Application Priority Data

Feb. 8, 2023 (SE) .................................... 2350119-0

(51) Int. Cl.
*B25F 5/00* (2006.01)
*B25F 5/02* (2006.01)
*H01H 36/00* (2006.01)

(52) U.S. Cl.
CPC ............... *B25F 5/02* (2013.01); *H01H 36/00* (2013.01)

(58) Field of Classification Search
CPC .............. B25F 5/00; B25F 5/02; H01H 36/00
See application file for complete search history.

(56) References Cited

U.S. PATENT DOCUMENTS 1,616,929 A * 2/1927 Stevens .................... B25D 9/16 251/232
3,343,613 A * 9/1967 Carnesecca, Jr. ... B27B 17/0016 30/228
6,025,683 A 2/2000 Philipp
6,854,566 B2 2/2005 Sweet et al.
7,004,367 B1 * 2/2006 Shen ....................... B25C 1/008 227/8
7,174,972 B2 2/2007 Kristen et al.
9,423,437 B2 8/2016 Praeger et al.
10,207,380 B2 * 2/2019 Billings .............. F21V 23/0471
2004/0206519 A1 * 10/2004 Kristen .................. B25F 5/006 173/217

(Continued)

FOREIGN PATENT DOCUMENTS

DE 29510696 U1 8/1995
EP 3155966 A1 4/2017
EP 3807597 B1 11/2022

OTHER PUBLICATIONS

Office Action and Search Report for Swedish Application No. 2350119-0 mailed on Aug. 31, 2023.

*Primary Examiner* — Eyamindae C Jallow
(74) *Attorney, Agent, or Firm* — Burr & Forman

(57) ABSTRACT

A handheld power tool (1) is disclosed comprising an electronic control unit (3), a housing (4) accommodating the electronic control unit (3), an actuator (5) movably arranged on the housing (4) between a first position and a second position, and a switch assembly (6) comprising a magnet (M) and a sensor (S) configured to sense the magnitude of a magnetic field. One of the sensor (S) and the magnet (M) is arranged in the housing (4) and the other of the sensor (S) and the magnet (M) is arranged on a portion (5') of the actuator (5) such that the relative distance between the magnet (M) and the sensor (S) is different when the actuator (5) is in the second position than when the actuator (5) is in the first position.

18 Claims, 3 Drawing Sheets

(56) References Cited

U.S. PATENT DOCUMENTS

| | | | | |
|---|---|---|---|---|
| 2007/0085496 | A1* | 4/2007 | Philipp | B01F 35/22161<br>318/139 |
| 2007/0132411 | A1 | 6/2007 | Stegmann et al. | |
| 2008/0053805 | A1 | 3/2008 | Wanek | |
| 2013/0014608 | A1* | 1/2013 | Yang | B25F 5/00<br>74/522 |
| 2013/0284480 | A1* | 10/2013 | Horie | B23B 45/02<br>173/217 |
| 2019/0255727 | A1* | 8/2019 | Wolf | B27B 17/08 |
| 2020/0235638 | A1* | 7/2020 | Velderman | H01H 9/063 |
| 2020/0269409 | A1 | 8/2020 | Braun et al. | |
| 2021/0231089 | A1 | 7/2021 | Rouleau | |
| 2021/0252688 | A1* | 8/2021 | Nyberg | B25F 5/02 |

* cited by examiner

HANDHELD POWER TOOL

TECHNICAL FIELD

The present disclosure relates to a handheld power tool comprising an electronic control unit and a housing accommodating the electronic control unit.

BACKGROUND

A handheld power tool is a tool intended to be supported by one or two hands of a user during operation. Moreover, a handheld power tool comprises a tool which can be driven by a power source other than solely manual labour. The power source may for example comprise a combustion engine, an electric motor, a pneumatic motor, or the like.

Today, there are many kinds of power tools available on the market. Examples are chainsaws, circular saws, jigsaws, trimmers, hedge trimmers, string-trimmers, brush-cutters, multi-tools, and the like. Power tools are for example used in industry, in construction, in gardens, for housework tasks, and around houses for purposes of cutting, shaping, sanding, grinding, routing, polishing, and the like.

Handheld power tools of various kind are associated with some mutual problems. One problem is reliability. Handheld power tools can be operated in dirty, wet, and dusty environments which can have a negative impact on the reliability of the handheld power tool. Moreover, the vibrations caused by the operation the tool, and/or of the power source, may also affect the reliability of the handheld power tool in a negative manner.

Another mutual problem associated with handheld power tools of various kinds is safety. That is, a power tool can comprise a sharp tool and a powerful power source for powering the tool, which poses a safety risk. Therefore, it is an advantage if operation of the power source can be rendered inoperable in a quick, simple, and consistent manner.

Moreover, when designing a handheld power tool, it may be wanted to add different features and functions while it is desired that the handheld power tool can be made compact and lightweighted. A compact handheld power tool having a low weight is preferred because the weight of the power tool puts strain to hands, arms, and back of a user. Moreover, if the handheld power tool can be made compact and lightweighted, it can allow users to operate the handheld power tool in a safer manner.

In addition, generally, it is an advantage if products comprise different features and functions while the products have conditions and/or characteristics suitable for being manufactured and assembled in a cost-efficient manner.

SUMMARY

It is an object of the present invention to overcome, or at least alleviate, at least some of the above-mentioned problems and drawbacks.

According to a first aspect of the invention, the object is achieved by a handheld power tool comprising an electronic control unit, a housing accommodating the electronic control unit, an actuator movably arranged on the housing between a first position and a second position, and a switch assembly comprising a magnet and a sensor configured to sense the magnitude of a magnetic field. One of the sensor and the magnet is arranged in the housing and the other of the sensor and the magnet is arranged on a portion of the actuator such that the relative distance between the magnet and the sensor is different when the actuator is in the second position than when the actuator is in the first position.

Due to these features, a contactless solution is provided capable of determining the position of the actuator relative to the housing in a reliable manner. In other words, conditions are provided for using the actuator as a reliable input unit for controlling a function of the handheld power tool, such as for disabling operation of a power source of the handheld power tool. Moreover, a function of the handheld power tool can be controlled in a manner being more resistant to moisture, dust, and debris.

In addition, conditions are provided for a compact handheld power tool because the actuator is movably arranged on the housing, which also accommodates the electronic control unit, and because one of the sensor and the magnet is arranged in the housing and the other of the sensor and the magnet is arranged on a portion of the actuator. As a further result of these features, conditions are provided for a short routing of electrical conductors, such as one or more cables, between the sensor and a control device of the handheld power tool, such as between the sensor and the electronic control unit. A short routing of electrical conductors can further ensure reliability of the handheld power tool and provides conditions for a compact handheld power tool. In addition, since the handheld power tool can be made compact, conditions are also provided for a lightweighted handheld power tool using the actuator as a reliable input unit for controlling a function of the handheld power tool.

Accordingly, a handheld power tool is provided overcoming, or at least alleviating, at least some of the above-mentioned problems and drawbacks. As a result, the above-mentioned object is achieved.

Optionally, the handheld power tool comprises a control circuit connected to the sensor, wherein the control circuit and the switch assembly are configured such that the control circuit switches from a first state to a second state when the actuator is moved from the first position to the second position. Thereby, a simple and reliable solution is provided capable of determining the position of the actuator relative to the housing. Moreover, due to these features, the control circuit can in a simple manner be connected to a control device of the handheld power tool, such as to the electronic control unit of the handheld power tool, to allow the control device to control one or more functions of the handheld power tool based on the state of the control circuit. Thereby, a simple, robust, and reliable solution is provided for controlling one or more functions of the handheld power tool based on the position of the actuator.

Optionally, the handheld power tool comprises a power source configured to power a tool of the handheld power tool, and a control arrangement operably connected to the power source, and wherein the control arrangement is configured to render the power source inoperable when the control circuit is in the second state. Thereby, a handheld power tool is provided in which the actuator can be used to render the power source inoperable in a simple, robust, and reliable manner while the handheld power tool has conditions for being compact. As a further result, a handheld power tool is provided having conditions for an improved operational safety.

Optionally, the power source is an internal combustion engine comprising an ignition device and a fuel supply system, and wherein the control arrangement is configured to render the power source inoperable by rendering at least one of the ignition device and the fuel supply system inoperable. Thereby, it can be ensured that the power source is rendered inoperable in an efficient and reliable manner. As a further result, a handheld power tool is provided having conditions for an improved operational safety.

Optionally, the power source is an internal combustion engine, and wherein the control arrangement comprises an ignition circuit configured to initiate ignition events performed by an ignition device of the internal combustion engine, and wherein the control arrangement is configured to break the ignition circuit when the control circuit switches to the second state. Thereby, it can be ensured that the power source is rendered inoperable in an efficient and reliable manner when the actuator is moved to the second position. As a further result, a handheld power tool is provided having conditions for an improved operational safety.

Optionally, the electronic control unit at least form part of the control arrangement. Thereby, conditions are provided for a compact and lightweighted handheld power tool having conditions for rendering operation of the power source inoperable in a simple, efficient, and reliable manner.

Optionally, the handheld power tool comprises a printed circuit board arranged inside the housing, and wherein the electronic control unit is arranged on the printed circuit board. Thereby, a handheld power tool is provided having conditions for being compact as well as conditions for providing some more advanced control functions.

Optionally, the sensor is arranged in the housing and the magnet is arranged on a portion of the actuator. Thereby, an even more reliable solution is provided for allowing a control of a function of the handheld power tool via the actuator. This is because the sensor may be stationary arranged relative to the housing and may in a simple and efficient manner be protected from moisture, dust, and debris by the housing, while the magnet is arranged on the portion of the actuator to move with the actuator. As a further result, a short routing of electrical conductors, such as one or more cables, between the sensor and a control device of the handheld power tool, such as between the sensor and the electronic control unit, can be further ensured. Moreover, the routing of such electrical conductors to/from the sensor is significantly facilitated and a short tolerance chain can be provided between the sensor and a control device of the handheld power tool. In addition, due to these features, it can be further ensured that the handheld power tool can be made compact and lightweighted.

Optionally, the handheld power tool comprises a printed circuit board arranged inside the housing, and wherein the sensor is arranged on the printed circuit board. Thereby, the routing of one or more electrical conductors to/from the sensor is further facilitated. Moreover, the sensor may in a simple and efficient manner be protected from moisture, dust, and debris by the housing in a simple and efficient manner. As a further result, an even more reliable solution is provided for allowing a control of a function of the handheld power tool via the actuator. Furthermore, since the sensor is arranged on the printed circuit board, a handheld power tool is provided having conditions and characteristics suitable for being manufactured and assembled in a cost-efficient manner.

Optionally, the sensor is a Hall effect sensor. Thereby, a simple, efficient, and reliable switch assembly is provided for determining the position of the actuator. Moreover, a handheld power tool is provided having conditions and characteristics suitable for being manufactured and assembled in a cost-efficient manner.

Optionally, the actuator is pivotally arranged on the housing around a pivot axis between the first and second positions. Thereby, conditions are provided for an even more compact handheld power tool using the actuator as a reliable input unit for controlling a function of the handheld power tool. Moreover, a handheld power tool is provided having conditions and characteristics suitable for being manufactured and assembled in a cost-efficient manner.

Optionally, the housing comprises a stop element configured to prevent movement of the actuator past the first position and prevent movement of the actuator past the second position. Thereby, conditions are provided for a handheld power tool being compact and durable. Moreover, since the stop element of the housing is configured to prevent movement of the actuator past the first position as well as configured to prevent movement of the actuator past the second position, a handheld power tool is provided having conditions and characteristics suitable for being manufactured and assembled in a cost-efficient manner.

Optionally, the handheld power tool comprises a resilient member configured to bias the actuator towards the first position. Thereby, conditions are provided for a compact handheld power tool using the actuator as a reliable input unit for controlling a function of the handheld power tool while it can be ensured that the actuator is returned to the first position when the actuator is not actuated.

Optionally, the actuator and the switch assembly are configured such that the relative distance between the magnet and the sensor is shorter when the actuator is in the first position than when the actuator is in the second position. Thereby, the operational safety of the handheld power tool may be further improved. This is because if for example the actuator is utilized for rendering a power source of the handheld power tool inoperable, it can be ensured that it is not possible to start the power source in case the magnet falls off the handheld power tool, in case the switch assembly becomes damaged, and in case the switch assembly or the actuator is not properly assembled.

Optionally, the handheld power tool is a chainsaw, a trimmer, or a brush cutter. Thereby, a chainsaw, a trimmer, or a brush cutter is provided having at least some of the above-mentioned advantages.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like reference signs refer to like elements throughout. Well-known functions or constructions will not necessarily be described in detail for brevity and/or clarity.

Figure 1:
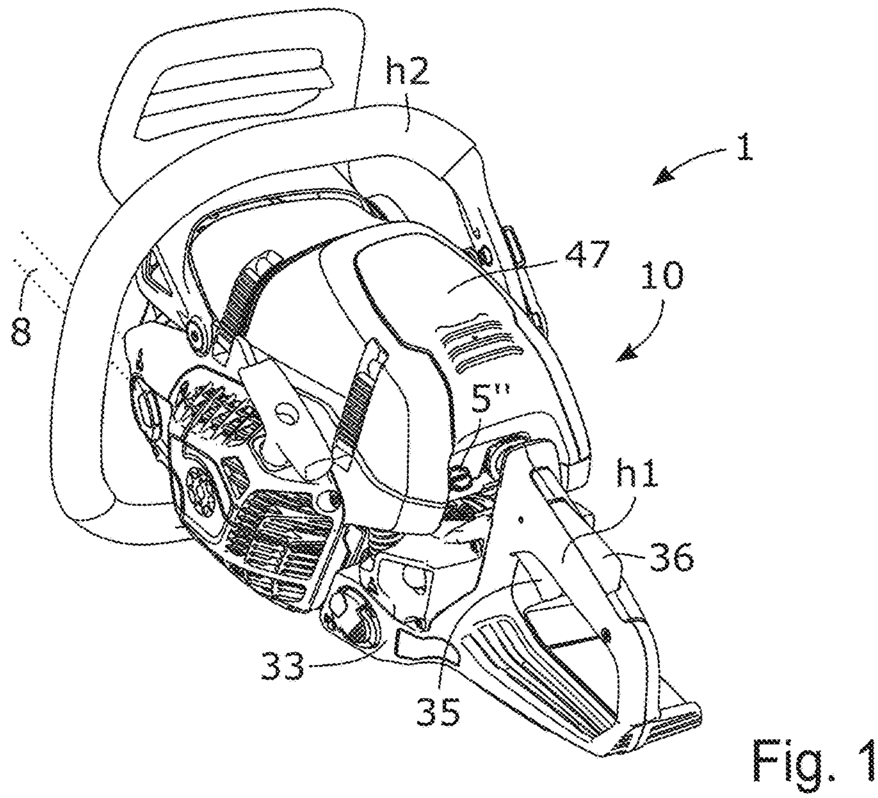
FIG. 1 illustrates a first perspective view of a handheld power tool according to some embodiments of the present disclosure.

FIG. 1 illustrates a first perspective view of a handheld power tool 1 according to some embodiments of the present disclosure. The handheld power tool 1 comprises a tool 8 and a power source 10 configured to power the tool 8. In FIG. 1, the power source 10 is obscured by an external cover 47 of the handheld power tool 1. Moreover, in FIG. 1, the tool 8 of the handheld power tool 1 is schematically indicated in dotted lines. According to the illustrated embodiments, the handheld power tool 1 is a chainsaw comprising a tool 8 in the form of a cutting chain movably arranged around a guide bar, wherein the power source 10 is configured to rotate the cutting chain around the guide bar.

According to further embodiments, the handheld power tool 1, as referred to herein, may be another type of handheld power tool 1, such as for example a power cutter, a circular saw, a brush cutter, a trimmer, a hedge trimmer, a multi-tool, or the like. Obviously, according to such embodiments, the handheld power tool 1 may comprise another type of tool 8 than a cutting chain, such as for example a saw blade, a trimmer head, a hedge trimmer cutting assembly, or the like.

According to the illustrated embodiments, the power source 10 of the handheld power tool 1 is an internal combustion engine. In more detail, according to the illustrated embodiments, the power source 10 is a small sized two-stroke internal combustion engine. The handheld power tool 1 comprises a fuel tank 33 configured to store fuel which is supplied to the internal combustion engine during operation thereof.

According to some further embodiments, the handheld power tool 1 may comprise another type of power source 10, such as an electric motor. According to such embodiments, the handheld power tool 1 may comprise an electric battery for supplying electricity to the electric motor during operation thereof. As an alternative, or in addition, the handheld power tool 1 may comprise another type of device for supplying electricity to the electric motor during operation thereof, such as a connector for connecting the electric motor to an electric power cord.

The handheld power tool 1 comprises a first handle h1 and a second handle h2. The second handle h2 is separate from the first handle h1 and is arranged at a distance from the first handle h1. The handheld power tool 1 is configured to be supported via each of the first and second handles h1, h2 during operation of the handheld power tool 1. In other words, the handheld power tool 1 is configured to be supported by two hands of a user during operation of the handheld power tool 1, i.e., is configured to be supported by one hand grabbing the first handle h1 and the other hand grabbing the second handle h2.

According to the illustrated embodiments, the first handle h1 is a rear handle arranged at a rear portion of the handheld power tool 1 and the second handle h2 is a so-called front handle. According to the illustrated embodiments, the second handle h2 is attached to a tool body of the handheld power tool 1 at a region of a tool portion of the handheld power tool 1. The tool portion of the handheld power tool 1 is a portion of the handheld power tool 1 to which the tool 8 is connected. In other words, according to the illustrated embodiments, the second handle h2 of the handheld power tool 1 is arranged closer to the tool 8 of the handheld power tool 1 than the first handle h1. Moreover, the second handle h2 is arranged at a position between the tool 8 of the handheld power tool 1 and the first handle h1 of the handheld power tool 1.

The first handle h1 is configured to be gripped by a hand of a user during operation of the handheld power tool 1. Likewise, the second handle h2 is configured to be gripped by a hand of a user during operation of the handheld power tool 1. The second handle h2 is formed by an elongated curved-shaped body allowing a user to grip the second handle h2 from various directions in a convenient manner which allows a user to operate the handheld power tool 1 at different orientations relative to the gravitational field in a convenient and safe manner.

The handheld power tool 1 comprises a throttle actuator 35 arranged at the first handle h1. The throttle actuator 35 can be used to control a power output of the power source 38. The handheld power tool 1 further comprises a safety actuator 36 arranged at the first handle h1. The safety actuator 36 is operably connected to a mechanism configured to prevent actuation of the throttle actuator 35 when the safety actuator 36 is not pressed and configured to allow actuation of the throttle actuator 35 when the safety actuator 36 is pressed. According to the illustrated embodiments, the safety actuator 36 is arranged to be pressed by the palm of a hand of a user whereas the throttle actuator 35 is arranged to be actuated, i.e., pressed, by one or more fingers of the hand of a user.

Figure 2:
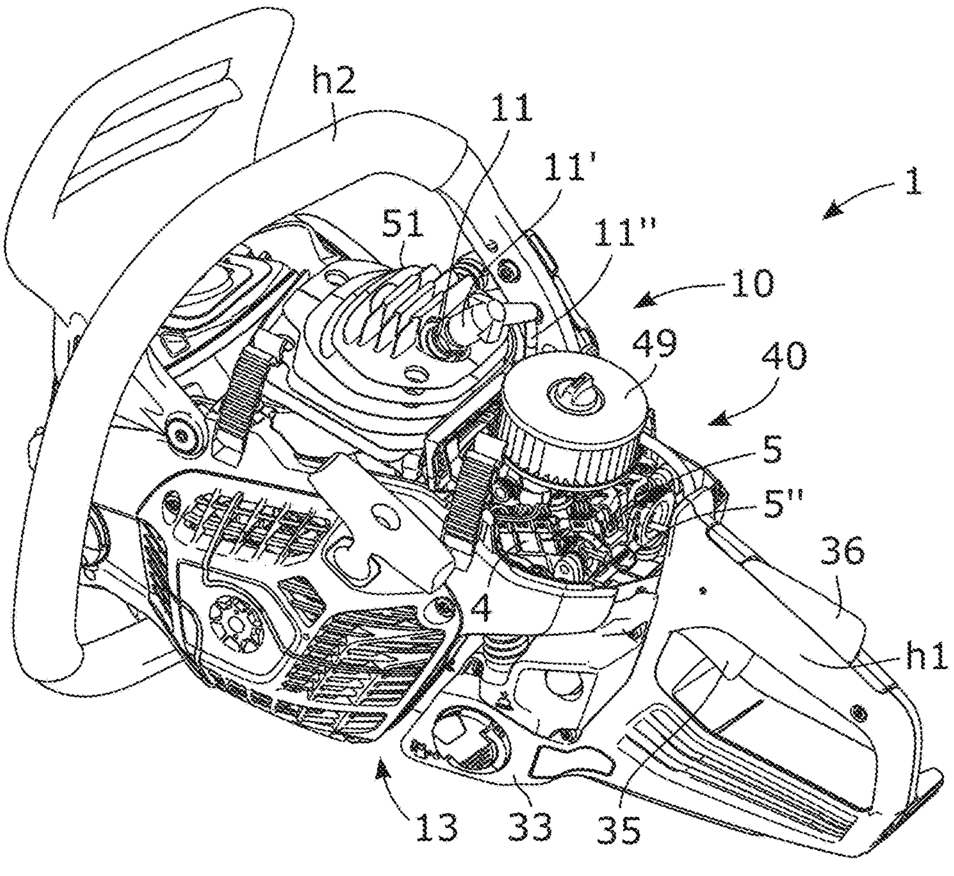
FIG. 2 illustrates a second perspective view of the handheld power tool illustrated in FIG. 1 in which an external cover of the handheld power tool has been removed.

FIG. 2 illustrates a second perspective view of the handheld power tool 1 illustrated in FIG. 1 in which the external cover 47 has been removed. In FIG. 2, the components of the power source 10 can be more clearly seen.

As mentioned, and as is clearly seen in FIG. 2, according to the illustrated embodiments, the power source 10 is an internal combustion engine. Therefore, the wording "the power source 10" as used herein may be replaced with the wording "the internal combustion engine".

The power source 10 comprises a cylinder 51 and a piston configured to reciprocate within the cylinder 51. The piston is not seen or indicated in FIG. 2. The power source 10 comprises an air filter unit 49. The air filter unit 49 is configured to filtrate air flowing from the surroundings into an air supply system of the power source 10. The power source 10 further comprises a fuel supply system 13 configured to supply fuel from the fuel tank 33 into the cylinder 51 during operation of the power source 10. In FIG. 2, the fuel supply system 13 is schematically indicated.

According to the illustrated embodiments, the fuel supply system 13 is a fuel injection system comprising a number of fuel injectors. The fuel supply system 13 may comprise one or more of a fuel injector configured to inject fuel into a crankcase volume of the power source 10, a fuel injector configured to inject fuel into the air inlet system of the power source 10, a fuel injector configured to inject fuel into an air inlet duct of the air inlet system of the power source 10, a fuel injector configured to inject fuel into a scavenging conduit of the power source 10, and a fuel injector configured to inject fuel directly into the cylinder 51 of the power source 10. According to further embodiments, the power source 10 may comprise another type of fuel supply system, such as a carburetor.

Moreover, the power source 10 comprises ignition device 11 configured to ignite an air/fuel mixture inside the cylinder 51 of the power source 10. According to the illustrated embodiments, the ignition device 11 is a spark plug configured to ignite the air/fuel mixture inside the cylinder 51 by generating a spark inside the cylinder 51. The power source 10 further comprises an ignition cap 11' connected to an end portion of the ignition device 11 as well as an ignition cable 11" attached to the ignition cap 11'. As is further explained herein, the ignition cable 11" is operably connected to an ignition circuit of the handheld power tool 1.

In FIG. 2, parts of a control assembly 40 of the handheld power tool 1 is seen. As is further explained herein, the control assembly 40 is configured to control at least one function of the handheld power tool 1.

Figure 3:
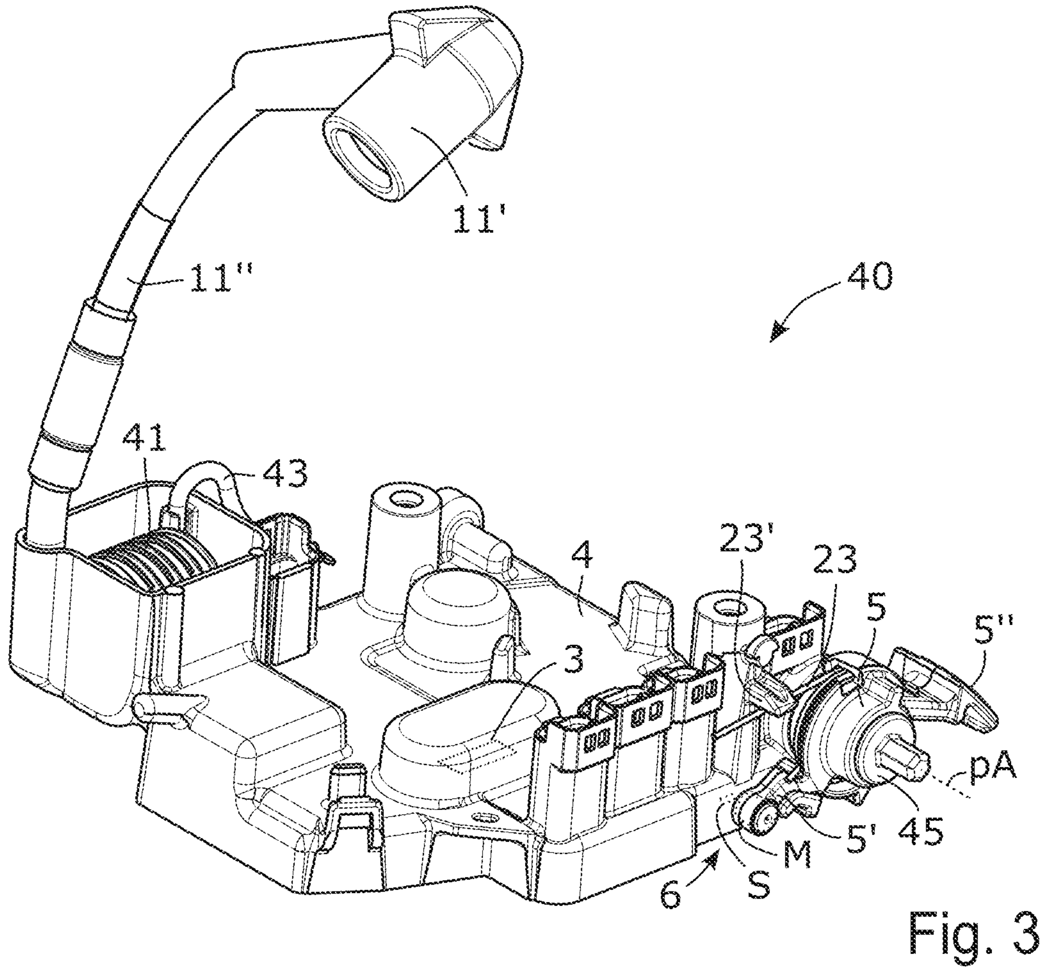
FIG. 3 illustrates a perspective view of a control assembly of the handheld power tool illustrated in FIG. 1 and FIG. 2.

FIG. 3 illustrates a perspective view of the control assembly 40 of the handheld power tool 1 illustrated in FIG. 1 and FIG. 2. The control assembly 40 comprises an electronic control unit 3 and a housing 4 accommodating the electronic control unit 3. The housing 4 of the control assembly 40 is also indicated in FIG. 2. In FIG. 3, the electronic control unit 3 is schematically illustrated in dashed lines. As is further explained herein, the electronic control unit 3 is configured to control at least one function of the handheld power tool comprising the electronic control unit 3.

Below, simultaneous reference is made to FIG. 1-FIG. 3, if not indicated otherwise. The control assembly 40 of the handheld power tool 1 comprises an actuator 5. The actuator 5 is movably arranged on the housing 4 between a first position and a second position. In FIG. 3, the actuator 5 is illustrated in the first position.

The control assembly 40 of the handheld power tool 1 further comprises a switch assembly 6. The switch assembly 6 comprises a magnet M and a sensor S, wherein the sensor S is configured to sense the magnitude of a magnetic field. According to the illustrated embodiments, the sensor S is arranged inside the housing 4 and the magnet M is arranged on a portion 5' of the actuator 5. However, according to further embodiments, the magnet M may be arranged in the housing 4 and the sensor S may be arranged on a portion 5' of the actuator 5. Thus, according to embodiments herein, one of the sensor S and the magnet M may be arranged in the housing 4 and the other of the sensor S and the magnet M may be arranged on a portion 5' of the actuator 5.

As is further explained herein, the control assembly 40 is configured such that the relative distance between the magnet M and the sensor S is different when the actuator 5 is in the second position than when the actuator 5 is in the first position.

Figure 4:
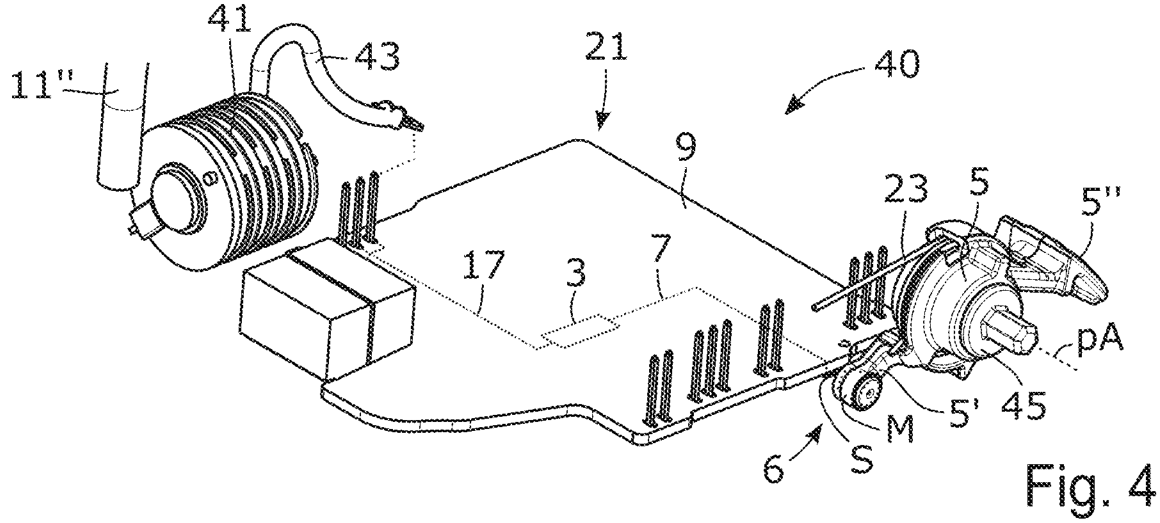
FIG. 4 illustrates the perspective view of the control assembly illustrated in FIG. 3 in which a housing has been removed.

FIG. 4 illustrates the perspective view of the control assembly 40 illustrated in FIG. 3 in which the housing 4 has been removed. Also in FIG. 4, the actuator 5 is illustrated in the first position. Below, simultaneous reference is made to FIG. 1-FIG. 4, if not indicated otherwise.

The control assembly 40 of the handheld power tool 1 comprises a control circuit 7 connected to the sensor S. As is further explained herein, the control circuit 7 and the switch assembly 6 are configured such that the control circuit 7 switches from a first state to a second state when the actuator 5 is moved from the first position to the second position.

According to the illustrated embodiments, the handheld power tool 1 comprises a printed circuit board 9 arranged inside the housing 4. The housing 4 is configured to form a protective environment inside the housing 4 being shielded from moisture, dust, and debris. The housing 4 may for example be formed by a polymeric material and may comprise a number of housing parts assembled to form the housing 4.

As seen in FIG. 4, according to the illustrated embodiments, the electronic control unit 3 is arranged on the printed circuit board 9. Moreover, according to the illustrated embodiments, the sensor S is arranged on the printed circuit board 9. Furthermore, the control circuit 7 is also arranged on the printed circuit board 9 and connects the electronic control unit 3 to the sensor S. In this manner, a short tolerance chain is provided between the electronic control unit 3 and the sensor S.

According to the illustrated embodiments, the sensor S is a Hall effect sensor, i.e., a type of sensor which detects the presence and magnitude of a magnetic field using the Hall effect. The sensor S is configured such that an output voltage of the sensor S is proportional to the strength of a magnetic field at the location of the sensor S.

As can be seen in FIG. 3 and FIG. 4, according to the illustrated embodiments, the actuator 5 is movably arranged relative to the housing 4 by being pivotally arranged on the housing 4 around a pivot axis pA between the first and second positions. The portion 5' of the actuator 5 referred to above, is a portion 5' of the actuator 5 located at a distance from the pivot axis pA.

The housing 4 may comprise a journal protruding from the housing 4 in a direction coinciding with the pivot axis pA, wherein the actuator 5 is pivotally arranged around the journal. According to the illustrated embodiments, the actuator 5 is pivotally attached to such a journal via a fastening member 45.

Figure 5:
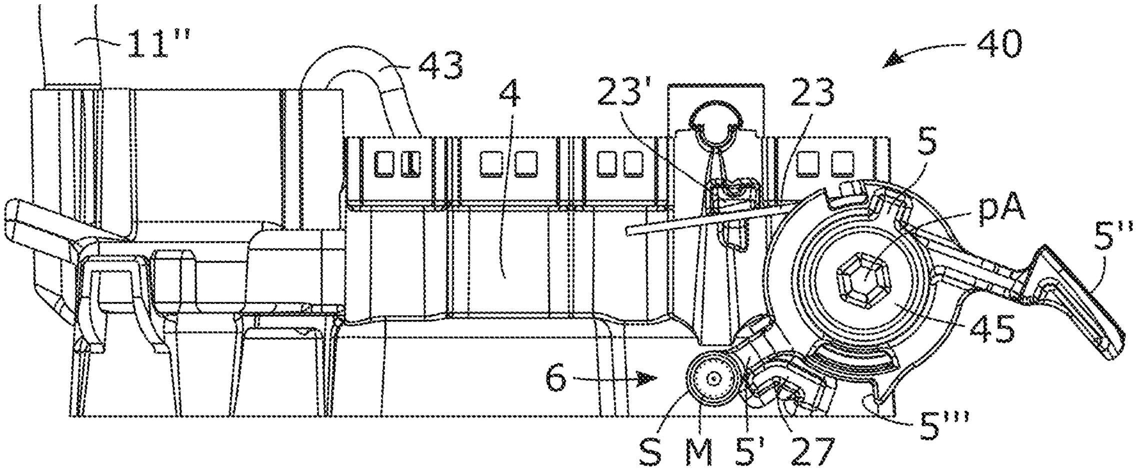
FIG. 5 illustrates a side view of the control assembly illustrated in FIG. 3.

FIG. 5 illustrates a side view of the control assembly 40 illustrated in FIG. 3. In FIG. 5, the actuator 5 is illustrated as viewed in a direction coinciding with the pivot axis pA of the actuator 5. Also in FIG. 5, the actuator 5 is illustrated in the first position. Below, simultaneous reference is made to FIG. 1-FIG. 5, if not indicated otherwise.

As indicated in FIG. 3-FIG. 5, the control assembly 40 of the handheld power tool 1 comprises a resilient member 23. The resilient member 23 is configured to bias the actuator 5 towards the first position. Moreover, as indicated in FIG. 5, according to the illustrated embodiments, the housing 4 comprises a stop element 27. The stop element 27 is configured to prevent movement of the actuator 5 past the first position by an abutting contact between a portion 5' of the actuator 5 and the stop element 27. That is, in more detail, according to the illustrated embodiments, the resilient element 23 is connected to a portion 23' of the housing 4 and is configured to apply a torque onto the actuator 5 in a counterclockwise direction in FIG. 5 such that the portion 5' of the actuator 5 is pressed against the stop element 27 of the housing 4.

Moreover, as indicated in FIG. 1-FIG. 5, the actuator 5 comprises a button portion 5". The button portion 5" of the actuator 5 is arranged at a distance from the pivot axis pA of the actuator 5. As seen in FIG. 1 and FIG. 2, the actuator 5 is arranged at the handheld power tool 1 such that the button portion 5" thereof faces a user of the handheld power tool 1 when the handheld power tool 1 is oriented in an intended operation orientation relative to the user.

Moreover, according to the illustrated embodiments, the actuator 5 is arranged on the handheld power tool 1 such that the button portion 5" is arranged adjacent to the first handle h1 of the handheld power tool 1 and such that the button portion 5" of the actuator 5 can be reached with a thumb of a hand of a user when the hand of the user is placed on the first handle h1.

The portion 5' of the actuator 5 referred to above, at which the magnet M is arranged, is arranged at a side of the actuator 5 facing away from a user of the handheld power tool 1 when the handheld power tool 1 is oriented in an intended operation orientation relative to the user. In other words, according to the illustrated embodiments, the portion 5' of the actuator 5 is arranged at an opposite side of the actuator 5 as compared to the button portion 5" of the actuator 5.

As seen in FIG. 3-FIG. 5, according to the illustrated embodiments, the actuator 5 and the switch assembly 6 are configured such that the magnet M superimposes the sensor S as seen in a direction coinciding with the pivot axis pA when the actuator 5 is in the first position.

Figure 6:
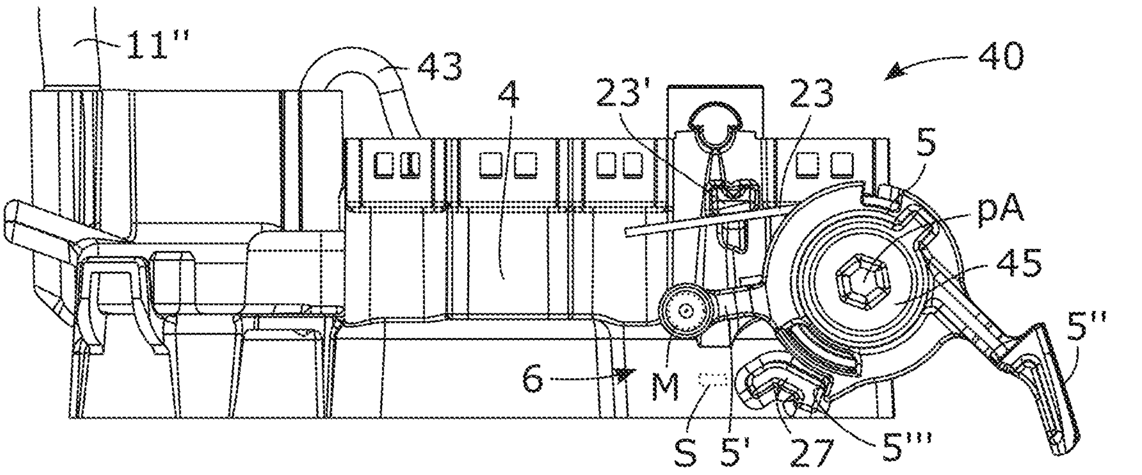
FIG. 6 illustrates the control assembly illustrated in FIG. 5 in which an actuator has been moved to a second position.

FIG. 6 illustrates the control assembly 40 illustrated in FIG. 5 in which the actuator 5 has been moved to the second position. Below, simultaneous reference is made to FIG. 1-FIG. 6, if not indicated otherwise. According to the illustrated embodiments, the actuator 5 can be moved from the first position to the second position by a pivoting movement of the actuator 5 around the pivot axis pA.

In more detail, the actuator 5 can be pivoted from the first position by applying a force or torque onto the button portion 5" of the actuator 5 having a magnitude and direction overcoming the biasing force of the resilient element 23. The resilient element 23 is compressed upon movement of the actuator 5 from the first position towards the second position. The abutting contact between the portion 5' of the actuator 5 and the stop element 27 is released when the actuator 5 is moved from the first position.

When the actuator 5 reaches the second position, an abutting contact is obtained between a second portion 5'" of the actuator 5 and the stop element 27 of the housing 4. In this manner, the stop element 27 prevents movement of the actuator 5 past the second position. The portion 5' of the actuator 5, referred to above, may also be referred to as a first portion of the actuator 5.

As can be seen when comparing FIG. 5 and FIG. 6, according to the illustrated embodiments, the actuator 5 and the switch assembly 6 are configured such that the relative distance between the magnet M and the sensor S is shorter when the actuator 5 is in the first position than when the actuator 5 is in the second position. The magnet M arranged on the portion 5' of the actuator 5 has thus been moved further from the sensor S in the movement from the first position illustrated in FIG. 5 to the second position illustrated in FIG. 6.

As mentioned, the sensor S is configured such that an output voltage of the sensor S is proportional to the strength of a magnetic field at the location of the sensor S. Since the relative distance between the magnet M and the sensor S changes upon movement of the actuator 5 between the first and second positions, the output voltage of the sensor S also changes upon movement of the actuator 5 between the first and second positions.

As indicated in FIG. 4, according to the illustrated embodiments, the control assembly 40 of the handheld power tool 1 comprises a control arrangement 21. The control arrangement 21 is operably connected to the power source 10. Moreover, the control arrangement 21 comprises the electronic control unit 3 and the control circuit 7. That is, according to the illustrated embodiments, the electronic control unit 3 form part of the control arrangement 21. As is further explained herein, the control arrangement 21 is configured to render the power source 10 inoperable when the control circuit 7 is in the second state.

According to the illustrated embodiments, the control arrangement 21 is configured to render the power source 10 inoperable by rendering the ignition device 11 inoperable. That is, in more detail, according to the illustrated embodiments, the control arrangement 21 comprises an ignition circuit 17. The ignition circuit 17 is configured to initiate ignition events performed by the ignition device 11 of the internal combustion engine. According to the illustrated embodiments, the control arrangement 21 is configured to break the ignition circuit 17 when the control circuit 7 switches to the second state, i.e., when the actuator 5 is moved to the second position. In this manner, the power source 10 is rendered inoperable in a simple, efficient, and reliable manner.

The ignition circuit 17 of the control arrangement 21 can be said to form part of an ignition system of the power source 10, wherein the ignition system comprises the ignition circuit 17, a control wire 43, and an ignition coil 41. As is best seen in FIG. 3, the ignition coil 41 is connected to the ignition cap 11' via the ignition cable 11". The ignition circuit 17 is configured to initiate ignition events performed by the ignition device 11 of the internal combustion engine by causing the ignition coil 41 to release a high electrical current through the ignition cable 11". The control arrangement 21 may be configured to cause the ignition coil 41 to release a high electrical current through the ignition cable 11" by generating a control signal supplied to the ignition coil 41 via the control wire 43. The control arrangement 21 may be configured to render the ignition device 11 inoperable by cancelling control signals supplied to the ignition coil 41 via the control wire 43.

As an alternative, or in addition to the above-described, the control arrangement 21 may be configured to render the power source 10 inoperable by rendering the fuel supply system 13 inoperable. The control arrangement 21 may be configured to render the fuel supply system 13 inoperable by rendering a number of fuel injectors of the fuel supply system 13 inoperable, by rendering a number of fuel injection valves of the fuel supply system 13 inoperable, and/or by rendering a fuel pump of the fuel supply system 13 inoperable.

Moreover, in embodiments in which the power source 10 of the handheld power tool 1 comprises an electric motor, the control arrangement 21 may be configured to render the power source 10 inoperable by rendering the electric motor inoperable and/or by rendering power electronics of the power source 10 inoperable.

As understood from the above described, the magnitude of the magnetic field sensed by the sensor S is weaker when the actuator 5 is in the second position as compared to when the actuator 5 is in the first position. According to these embodiments, the control circuit 7 is configured to switch to the second state when the magnitude of the magnetic field sensed by the sensor S drops below a threshold magnitude. In more detail, according to these embodiments, the switch assembly 6 is configured such that the sensor S generates an output voltage being below a threshold voltage when the actuator 5 is moved to the second position, wherein the control circuit 7 is configured to switch from the first state to the second state when the output voltage drops below the threshold voltage.

Moreover, as mentioned, according to the illustrated embodiments, the control arrangement 21 is configured to break the ignition circuit 17 when the control circuit 7 switches to the second state. In this manner, it can be ensured that the power source 10 is rendered inoperable when the actuator 5 is moved to the second position. The ignition circuit 17 may be braked using a switch.

Moreover, it can be ensured that the power source 10 is rendered inoperable in case the magnet M of the switch assembly 6 is lost for some reason, in case the switch assembly 6 becomes damaged, and in case the switch assembly 6 or the actuator 5 is not properly assembled. This is because the control circuit 7 is configured to switch to the second state when the magnitude of the magnetic field sensed by the sensor S drops below the threshold magnitude.

Moreover, according to the illustrated embodiments, the ignition circuit 17 of the control arrangement 21 is normally open meaning that the control circuit 7 is needed to be switched to the second state by the presence of a magnet M to close the ignition circuit 17 to thereby enable operation of the power source 10. In this manner, the safety of operation of the handheld power tool 1 is further improved in a simple and efficient manner.

As mentioned, according to the illustrated embodiments, the actuator 5 is movably arranged between the first and second positions referred to herein. According to further embodiments, the actuator 5 may be movably arranged to a third position. According to such embodiments, the control arrangement 21, or any other part of the handheld power tool 1 comprising the control assembly 40, may be configured to generate a control function upon movement of the actuator 5 to such a third position. Purely as an example, the actuator 5 may be operably connected to a choke valve of the power source 10, wherein the choke valve is configured to assume a closed position upon movement of the actuator 5 to such a third position.

The first position of the actuator 5, as referred to herein, may also be referred to a "run position" and the first state of the control circuit 7, as referred to herein, may also be referred to as a "run state". This is because, according to the illustrated embodiments, the control circuit 7 is configured to assume the first state upon movement of the actuator 5 to the first position and because the control arrangement 21 is configured to enable operation of the power source 10 when the control circuit 7 is in the first state.

Likewise, the second position of the actuator 5, as referred to herein, may also be referred to a "stop position" and the second state of the control circuit 7, as referred to herein, may also be referred to as a "stop state" or "stopping state". This is because, according to the illustrated embodiments, the control circuit 7 is configured to assume the second state upon movement of the actuator 5 to the second position and because the control arrangement 21 is configured render the power source 10 inoperable, i.e., is configured to stop operation of the power source 10, when the control circuit 7 is in the second state.

The control assembly 40, such as the control arrangement 21 and/or the electronic control unit 3 of the control assembly 40, may be configured to control operation of power source 10, such as controlling operation of the ignition device 11 and/or the fuel supply system 13 of the power source 10. According to the illustrated embodiments, the electronic control unit 3 is configured to control operation of power source 10 by controlling operation of at least one of the ignition device 11 and the fuel supply system 13 of the power source 10. According to these embodiments, the electronic control unit 3 may also be referred to as "an engine control unit".

One skilled in the art will appreciate that the control arrangement 21 and/or the electronic control unit 3 may be configured to use programmed instructions when controlling at least one function of the handheld power tool 1 explained herein, for example when rendering the power source 10 inoperable and/or when controlling the ignition and fuel injection of the power source 10. These programmed instructions are typically constituted by a computer program, which, when it is executed in the control arrangement 21 and/or the electronic control unit 3, ensures that the control arrangement 21 and/or the electronic control unit 3 carries out the control. The computer program may be part of a computer program product which comprises a suitable digital storage medium on which the computer program is stored.

The control arrangement 21 and/or the electronic control unit 3 may comprise a calculation unit which may take the form of substantially any suitable type of processor circuit or microcomputer, e.g., a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above.

Moreover, the control arrangement 21 and/or the electronic control unit 3 of the handheld power tool 1 may comprise a memory unit, wherein the calculation unit may be connected to the memory unit, which may provide the calculation unit with, for example, stored program code and/or stored data which the calculation unit may need to enable it to do calculations. The calculation unit may also be adapted to store partial or final results of calculations in the memory unit. The memory unit may comprise a physical device utilised to store data or programs, i.e., sequences of instructions, on a temporary or permanent basis.

According to some embodiments, the memory unit may comprise integrated circuits comprising silicon-based transistors. The memory unit may comprise e.g., a memory card, a flash memory, a USB memory, a hard disc, or another similar volatile or non-volatile storage unit for storing data such as e.g., ROM (Read-Only Memory), PROM (Programmable Read-Only Memory), EPROM (Erasable PROM), EEPROM (Electrically Erasable PROM), etc. in different embodiments.

The control arrangement 21 and/or the electronic control unit 3 is connected to components of the handheld power tool 1 for receiving and/or sending input and output signals. These input and output signals may comprise waveforms, pulses, or other attributes which the input signal receiving devices can detect as information and which can be converted to signals processable by the control arrangement 21, and/or by the electronic control unit 3 of the control arrangement 21. These signals may then be supplied to the calculation unit.

One or more output signal sending devices may be arranged to convert calculation results from the calculation unit to output signals for conveying to other parts of the control system of the handheld power tool 1 and/or the component or components for which the signals are intended. Each of the connections to the respective components of the handheld power tool 1 for receiving and sending input and output signals may take the form of one or more from among a conductor on a printed circuit board, a cable, a data bus, e.g., a CAN (controller area network) bus, or some other bus configuration, or a wireless connection.

In the embodiments illustrated, the handheld power tool 1 comprises a control arrangement 21 and an electronic control unit 3 but might alternatively be implemented wholly or partly in two or more control arrangements and/or two or more electronic control units.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A handheld power tool comprising:
an electronic control unit,
a housing accommodating the electronic control unit,
an actuator movably arranged on the housing between a first position and a second position, and
a switch assembly comprising a magnet and a sensor configured to sense a magnitude of a magnetic field,
wherein one of the sensor and the magnet is arranged in the housing and the other of the sensor and the magnet is arranged on a portion of the actuator such that a relative distance between the magnet and the sensor is different when the actuator is in the second position than when the actuator is in the first position,
wherein the handheld power tool comprises a control circuit connected to the sensor, wherein the control circuit and the switch assembly are configured such that the control circuit switches from a first state to a second state when the actuator is moved from the first position in which the actuator is unactuated to the second position in which the actuator is actuated,
wherein the handheld power tool further comprises:
a power source configured to power a tool of the handheld power tool, and
a control arrangement operably connected to the power source,
wherein responsive to the control circuit being in the first state, the control arrangement is configured to render the power source operable, and
wherein responsive to the control circuit being in the second state, the control arrangement is configured to render the power source inoperable.

2. The handheld power tool according to claim 1, wherein the power source is an internal combustion engine comprising an ignition device and a fuel supply system, and wherein the control arrangement is configured to render the power source inoperable by rendering at least one of the ignition device and the fuel supply system inoperable.

3. The handheld power tool according to claim 1, wherein the power source is an internal combustion engine, and wherein the control arrangement comprises an ignition circuit configured to initiate ignition events performed by an ignition device of the internal combustion engine, and wherein the control arrangement is configured to break the ignition circuit when the control circuit switches to the second state.

4. The handheld power tool according to claim 1, wherein the electronic control unit at least form part of the control arrangement.

5. The handheld power tool according to claim 1, wherein the handheld power tool comprises a printed circuit board arranged inside the housing, and wherein the electronic control unit is arranged on the printed circuit board.

6. The handheld power tool according to claim 1, wherein the sensor is arranged in the housing and the magnet is arranged on the portion of the actuator.

7. The handheld power tool according to claim 1, wherein the handheld power tool comprises a printed circuit board arranged inside the housing, and wherein the sensor is arranged on the printed circuit board.

8. The handheld power tool according to claim 1, wherein the sensor is a Hall effect sensor.

9. The handheld power tool according to claim 1, wherein the actuator is pivotally arranged on the housing around a pivot axis between the first and second positions.

10. The handheld power tool according to claim 1, wherein the actuator and the switch assembly are configured such that the relative distance between the magnet and the sensor is shorter when the actuator is in the first position than when the actuator is in the second position.

11. The handheld power tool according to claim 1, wherein the handheld power tool is a chainsaw, a trimmer, or a brush cutter.

12. A handheld power tool comprising:
an electronic control unit,
a housing accommodating the electronic control unit,
an actuator movably arranged on the housing between a first position and a second position, and
a switch assembly comprising a magnet and a sensor configured to sense a magnitude of a magnetic field,
wherein one of the sensor and the magnet is arranged in the housing and the other of the sensor and the magnet is arranged on a portion of the actuator such that a relative distance between the magnet and the sensor is different when the actuator is in the second position than when the actuator is in the first position,
wherein the actuator is substantially cylindrical and rotatable about a pivot axis between the first and second positions,
wherein the housing comprises a stop element configured to prevent movement of the actuator past the first position and prevent movement of the actuator past the second position, and
wherein the stop element is disposed a distance approximately equal to a radius of the actuator away from the pivot axis, and the circumference of the actuator rides along the stop element between the first and second positions.

13. A handheld power tool comprising:
an electronic control unit,
a housing accommodating the electronic control unit,
an actuator movably arranged on the housing between a first position and a second position, and
a switch assembly comprising a magnet and a sensor configured to sense a magnitude of a magnetic field,
wherein one of the sensor and the magnet is arranged in the housing and the other of the sensor and the magnet is arranged on a portion of the actuator such that a relative distance between the magnet and the sensor is different when the actuator is in the second position than when the actuator is in the first position, and
wherein the handheld power tool comprises a resilient member configured to bias the actuator towards the first position.

14. The handheld power tool according to claim 13, wherein the handheld power tool comprises a control circuit connected to the sensor, wherein the control circuit and the switch assembly are configured such that the control circuit switches from a first state to a second state when the actuator is moved from the first position to the second position.

15. The handheld power tool according to claim 14, wherein the handheld power tool further comprises:
a power source configured to power a tool of the handheld power tool, and a control arrangement operably connected to the power source, and wherein the control arrangement is configured to render the power source inoperable when the control circuit is in the second state.

16. The handheld power tool according to claim 15, wherein the power source is an internal combustion engine comprising an ignition device and a fuel supply system, and wherein the control arrangement is configured to render the power source inoperable by rendering at least one of the ignition device and the fuel supply system inoperable.

17. The handheld power tool according to claim 15, wherein the power source is an internal combustion engine, and wherein the control arrangement comprises an ignition circuit configured to initiate ignition events performed by an ignition device of the internal combustion engine, and wherein the control arrangement is configured to break the ignition circuit when the control circuit switches to the second state.

18. The handheld power tool according to claim 15, wherein the electronic control unit at least form part of the control arrangement.

* * * * *